United States Patent [19]

Yamawaki

[11] Patent Number: 5,661,708
[45] Date of Patent: Aug. 26, 1997

[54] APPARATUS AND METHOD FOR DETECTING A SYNC PATTERN AND AN ADDRESS MARK WITHIN DATA PROVIDED FROM A RECORDING MEDIUM

[75] Inventor: Masashi Yamawaki, Kasugai, Japan

[73] Assignee: Fujitsu Limited, Kawasaki, Japan

[21] Appl. No.: 615,390

[22] Filed: Mar. 14, 1996

[30] Foreign Application Priority Data

Mar. 20, 1995 [JP] Japan .................................. 7-061274

[51] Int. Cl.$^6$ ...................................................... G11B 7/00
[52] U.S. Cl. ...................... 369/59; 369/32; 369/50; 369/48; 360/29; 360/48
[58] Field of Search ........................ 369/59, 60, 58, 369/47, 48, 49, 50, 54, 32, 124, 116; 360/48, 29, 30, 39

[56] References Cited

U.S. PATENT DOCUMENTS

4,866,692  9/1989  Saito et al. ............................ 369/59
5,150,351  9/1992  Ohno et al. .......................... 369/116
5,383,171  1/1995  Mizokami et al. ...................... 369/59

*Primary Examiner*—Muhammad N. Edun
*Attorney, Agent, or Firm*—Greer, Burns & Crain, Ltd.

[57] ABSTRACT

A disk apparatus for reproducing pulse width modulation (PWM) data from a disk is disclosed. A first sync pattern detector compares data DTLE with a first sync pattern. A second sync pattern detector compares data DTTE with a second sync pattern. A first signal generator stops the detecting operation of the first detector when the first detector has detected the first sync pattern from the data DTLE. A second signal generator stops the detecting operation of the second detector when the second detector has detected the second sync pattern from the data DTTE. A first time check circuit restarts the detecting operation of the first detector when the first sync pattern has been detected first and the second sync pattern is not detected within a predetermined period of time. A second time check circuit restarts the detecting operation of the second detector when the second sync pattern has been detected first and the first sync pattern is not detected within a predetermined period of time.

4 Claims, 7 Drawing Sheets

RD_PPM  ⎯⎯⎯⎯⎯⎯⎯⎯ pulse train ⎯⎯⎯⎯

RD_PWM  ⎯⎯⎯⎯⎯⎯⎯⎯ pulse train ⎯⎯⎯⎯

DTLE    0001000000100000001000010000000

DTTE    0000001000001000000010001000000

RD_PWM  5V / 0V waveform — V_ref

RD_PWM  sinusoidal waveform — V_ref

RD_PWM  sinusoidal waveform with L1, L2 marked — V_ref

APPARATUS AND METHOD FOR DETECTING A SYNC PATTERN AND AN ADDRESS MARK WITHIN DATA PROVIDED FROM A RECORDING MEDIUM

BACKGROUND OF THE INVENTION

1. Field of the Invention

The present invention relates generally to a method for reading, and a data reading apparatus for a disk drive apparatus, and more particularly, to an apparatus and method for detecting and reading a sync pattern or an address mark within data recorded on a recording medium by a pulse width modulation (PWM) system.

2. Description of the Related Art

Higher density is in demand for recording media such as magneto-optic disks. In this respect, pulse width modulation (PWM) systems for recording data on a recording medium have been receiving more widespread attention than the conventional Pit Position Modulation (PPM) system.

Conventionally, a typical system for recording data on a recording medium such as an optical disk is pit position modulation (PPM). In a PPM system, when one-byte of data, for example, "0, 1, 0, 1, 0, 1, 0, 1" is to be recorded on a recording medium, a plurality of recording areas have to be secured in association with the individual bits of that one-byte of data. The data pertaining to the individual bits are stored in the associated recording areas. Upon reading the one-byte of data from a recording medium, a drive head sequentially seeks the recording areas associated with the individual bits, thereby obtaining the one-byte of data. In a PPM system, it is required to secure a single recording area for a single bit.

One way to increase and, therefore, improve the recording density in a recording medium is to narrow or shorten the width of a recording area for one bit. As the width of each recording area is narrowed, a higher recording density is ensured, but the period of waveforms of signals provided from the drive head become shorter. Additionally, in order to narrow the width of each recording area, it is required to decrease the spot size of an optical pickup device which constitutes the drive head. The requirements on processing signals by a signal processing circuit are such that either, the sampling period should be made shorter, or the spot size should be made smaller. Therefore, there is a limit to improving the recording density of a medium by narrowing the widths of recording areas.

A great deal of attention is paid to using a PWM system as an approach to improve the recording density in a recording medium. In the case of recording one byte of data on a recording medium in accordance with a PWM system, for example, all of the bits lying between a bit indicative of "1" and a subsequent bit indicative of "1" are regarded as indicating "0".

Figure 1:
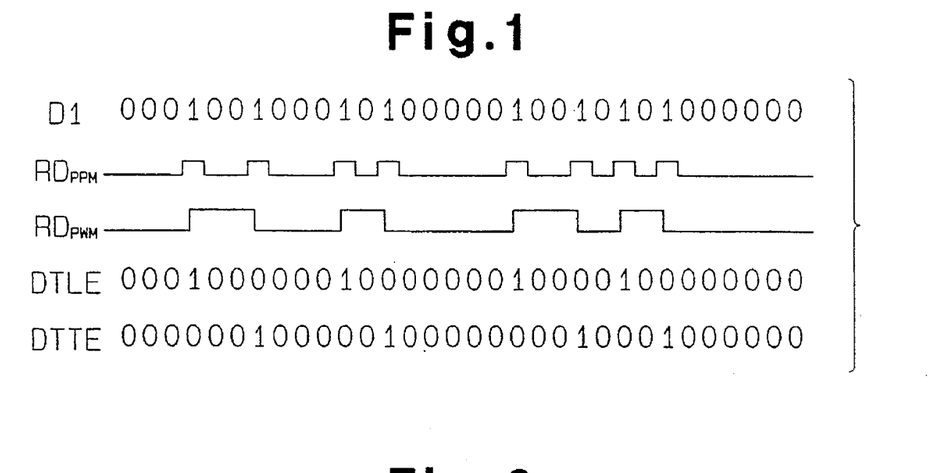
FIG. 1 is an explanatory diagram for explaining the difference between a PWM system and a PPM system.

Referring to FIG. 1, the difference between a PWM system and the conventional PPM system will be described in more detail. FIG. 1 shows a waveform $RD_{PPM}$ of data D1, read by the drive head from a recording medium in which the data D1 has been recorded following the conventional PPM system, and a waveform $RD_{PWM}$ of data D1, read by the drive head from a recording medium in which the data D1 has been recorded following the PWM system.

In the PPM system, data of "1" is all represented as a signal waveform with a high potential level (i.e., an H level), while data of "0" is all represented as a signal waveform with a low potential level (i.e., an L level).

In contrast, according to the PWM system, every time a bit with data of "1" is read, the potential level of the signal waveform $RD_{PWM}$ is inverted. The signal waveform rises to the H level at the fourth bit having data of "1", and falls to the L level at the seventh bit having data of "1", as shown in FIG. 1. The signal waveform rises again to the H level at the eleventh bit having data of "1", and falls to the L level at the thirteenth bit having data of "1". Likewise, the signal waveform rises to the H level at the nineteenth bit having data of "1", falls to the L level at the twenty-second bit having data of "1", rises again to the H level at the twenty-fourth bit having data of "1", and falls to the L level at the twenty-sixth bit having data of "1".

In other words, unlike the PPM system, the PWM system does not need to secure a single recording area on a recording medium for a single bit. As mentioned above, the PWM system recognizes all of the bits lying between a first bit with data of "1" and a second bit with data of "1" as having data of "0". Accordingly, the period of the signal waveform $RD_{PWM}$ of the data D1 read according to the PWM system is longer, at any point in time, than the period of the waveform $RD_{PPM}$ of data D1 read according to the PPM system. Considering the characteristics of a PWM type recording medium and a PPM type recording medium, the width of the recording area required per bit may be set to be more narrow by the PWM system in which a single recording area can be assigned for a plurality of consecutive bits, compared with the PPM system in which a single recording area is required for a single bit. Accordingly, the PWM system is more advantageous than the PPM system when it comes to increasing the recording density on a recording medium.

Furthermore, the PPM system differs from the PWM system as to how one byte of data is recorded in a user data section in each sector on a recording medium. According to the PPM system, one byte of data input by a user is converted into data of 16 channels (two bytes), with reference to a previously prepared conversion table, and the 16 channel data are in turn recorded in a user data section of a sector. In contrast, according to the PWM system, one byte of data input by a user is converted to data of 12 channels (1.5 bytes), with reference to a previously prepared conversion table, and the 12 channel data are in turn recorded in a user data section of a sector. In this respect, the PWM system has once again been shown to be more advantageous than the PPM system in the area of increasing the recording density on a recording medium.

Figure 2:
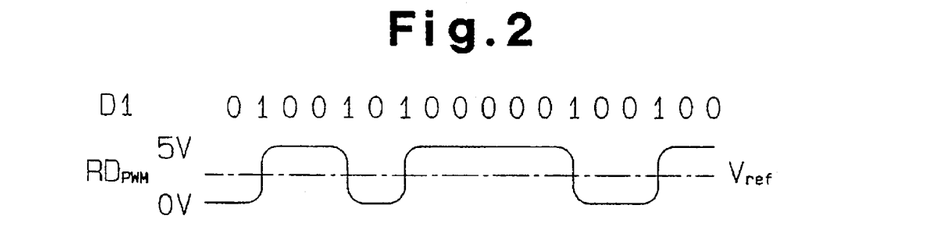
FIG. 2 is a diagram for explaining how to read data.

The act of reading data, recorded on a recording medium by the PWM system, is executed by a signal processing circuit in a manner as described below. When data D1 as shown in FIG. 2 is read by a drive head, the signal waveform $RD_{PWM}$ of the read data D1 has a rectangular waveform. The rising edge (i.e., leading edge) and falling edge (i.e., trailing edge) of the signal waveform $RD_{PWM}$ are detected by a detecting circuit (e.g. comparator) coupled to the drive head. Assuming that the H level and the L level of the waveform $RD_{PWM}$ are set to 5 volts and 0 volts, respectively, for example, a reference voltage $V_{ref}$ is set to 2.5 volts. The comparator compares the potential level of the signal waveform $RD_{PWM}$ with the reference voltage $V_{ref}$. When the potential level of the signal waveform $RD_{PWM}$ exceeds the reference voltage $V_{ref}$, the potential level is regarded as a H level. When the potential level of the signal waveform $RD_{PWM}$ is equal to or lower than the reference voltage $V_{ref}$, the potential level is regarded as a L level. When the potential level of the output from the comparator is inverted, i.e., when a leading edge or trailing edge is detected, it is determined that a bit with data of "1" has been read. As long as the output of the comparator is not inverted, i.e., as long as neither a leading edge nor a trailing edge is detected, it is determined that bits having data of "0" are being read at a predetermined sampling period.

The signal waveform $RD_{PWM}$ of the drive head may unfortunately vary in its potential level either due to noise originating from DC signal components, or due to the signal waveform $RD_{PWM}$ becoming dull. The variation in the potential level becoming of $RD_{PWM}$ is such that the L and H levels of the waveform $RD_{PWM}$ do not become 0 volts and 5 volts, respectively, and the potential level of the whole signal waveform generally varies so that an offset voltage is temporarily generated. The dull waveform means that the waveform $RD_{PWM}$ is not a rectangular waveform, and the rising and falling of the signal is very gradual due to a fast reading speed.

Figure 3:
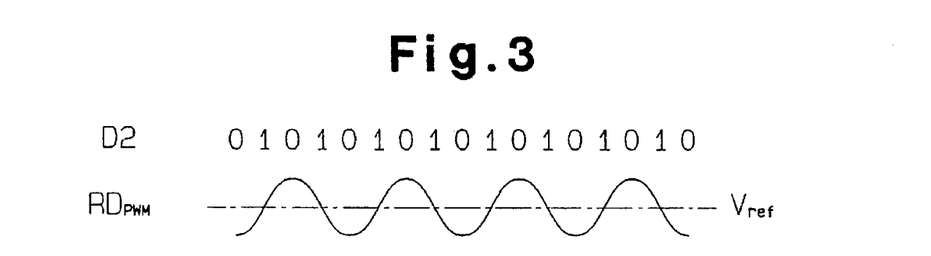
FIG. 3 is a waveform diagram illustrating a data waveform of a lockup pattern section.

Generally speaking, data D2, which is recorded in a lockup pattern section (VFO section) provided in each of sectors on a recording medium, contains "0" and "1" arranged alternately, as shown in FIG. 3. When a drive head reads the data D2 from a recording medium in which data have been recorded in accordance with the PWM system, the signal waveform $RD_{PWM}$ of the read data D2 has a form as shown in FIG. 3. In other words, even if recording has been done with the PWM system, the read waveform $RD_{PWM}$ begins to approximate a sine wave. If DC component noise is superimposed on the signal waveform $RD_{PWM}$, the entire waveform $RD_{PWM}$ varies in accordance with the strength of the DC noises.

Figure 4:
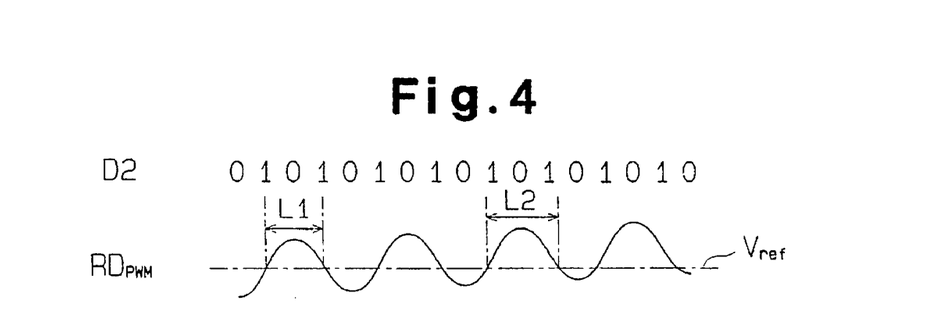
FIG. 4 is a waveform diagram illustrating a data waveform of the lockup pattern section.

FIG. 4 shows a signal waveform $RD_{PWM}$ containing a DC component. If the leading and trailing edges of the waveform $RD_{PWM}$ are determined with reference to a single reference voltage $V_{ref}$, the data D2 may be erroneously read out. Even when the voltage potential level of the entire waveform $RD_{PWM}$ changes, the reference voltage does not change accordingly. In FIG. 4, L1 indicates an interval from a leading edge to a trailing edge of an unchanged section in which the potential level of the signal waveform is appropriate, while L2 indicates an interval from a leading edge to a trailing edge of a changed section in which the potential level of the signal waveform varies. The interval L1 differs from the interval L2. The difference between the intervals L1 and L2 is reflected as the difference in the number of bits having data of "0" lying in the intervals L1 and L2. Specifically, when the interval L2 is longer by one bit than the interval L1, the data in the interval L1 will be correctly determined as "101" but the data in the interval L2 will be erroneously determined as "1001", because of the constant sampling period.

Figure 5:
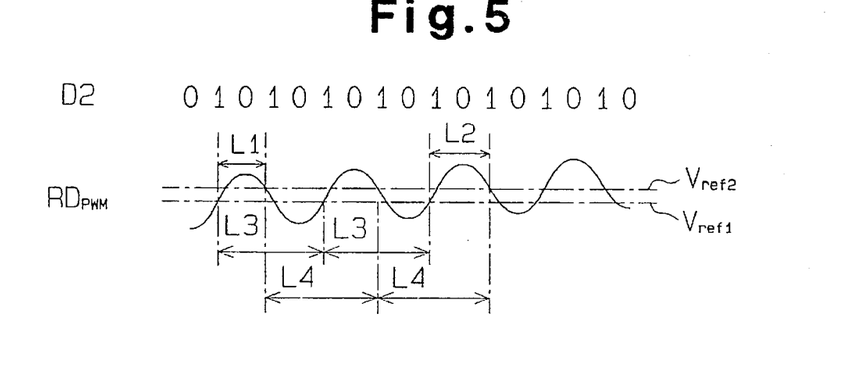
FIG. 5 is a waveform diagram illustrating a data waveform of the lockup pattern section.

To avoid such erroneous determinations, the leading edge and trailing edge can be separately detected by using a first reference voltage to detect a leading edge, $V_{ref1}$, and a second reference voltage to detect a trailing edge, $V_{ref2}$. FIG. 5 shows the relationship between the waveform $RD_{PWM}$ shown in FIG. 4 and the first and second reference voltages $V_{ref1}$ and $V_{ref2}$. Even in this case, there is a difference between the interval L1 and the interval L2. However, an interval L3 from a leading edge to the next leading edge is substantially the same as an interval L3 in the normal case in which the signal waveform has an appropriate voltage potential level, while an interval L4 from a trailing edge to the next trailing edge is substantially the same as an interval L4 in the normal case. Therefore, the use of two reference voltages $V_{ref1}$ and $V_{ref2}$ prevents the number of "0" data bits from being erroneously determined as greater than a correct number, thereby allowing for correct data reading.

Figure 6:
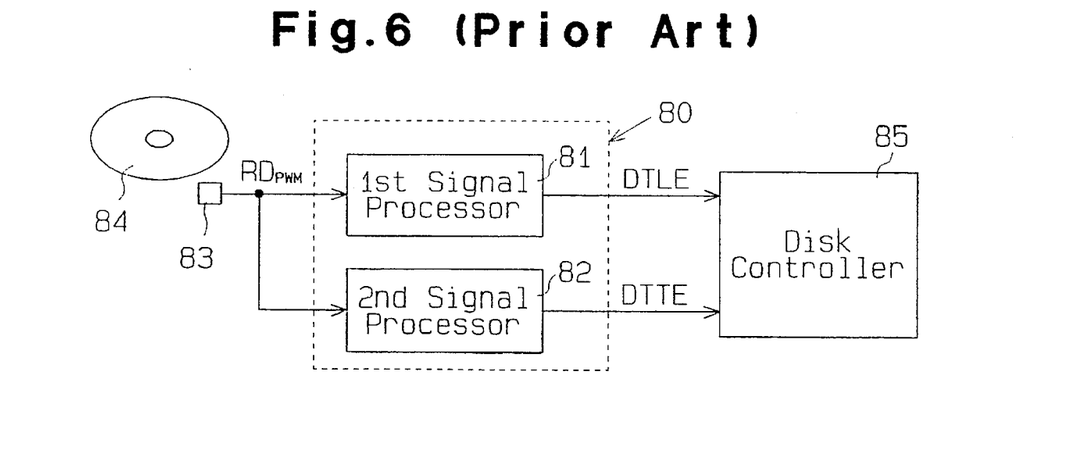
FIG. 6 is a block circuit diagram illustrating a conventional signal processing circuit.

The edge detection with two reference voltages $V_{ref1}$ and $V_{ref2}$ is executed by a signal processing circuit 80 provided with first and second signal processors 81 and 82, as shown in FIG. 6. The first signal processor 81 receives data $RD_{PWM}$ read by a drive head 83 from an optical disk 84 on which data is recorded in accordance with the PWM system, and detects leading edges of a waveform of the read data $RD_{PWM}$ with reference to the first reference voltage $V_{ref1}$. When a leading edge is detected on the waveform $RD_{PWM}$, the first signal processor 81 outputs bit data indicative of "1". The first signal processor 81 also outputs a plurality of pieces of bit data indicative of "0" and determines the number of data "0" based on the sampling periods between consecutive leading edges.

Likewise, the second signal processor 82 receives the read data $RD_{PWM}$ output from the drive head, and detects trailing edges of the waveform $RD_{PWM}$ with reference to the second reference voltage $V_{ref2}$. When a trailing edge is detected on the waveform $RD_{PWM}$, the second signal processor 82 outputs bit data indicative of "1". The second signal processor 82 also outputs a plurality of pieces of bit data indicative of "0" and determines the number of data "0" based on the sampling periods between consecutive trailing edges.

Figure 7:
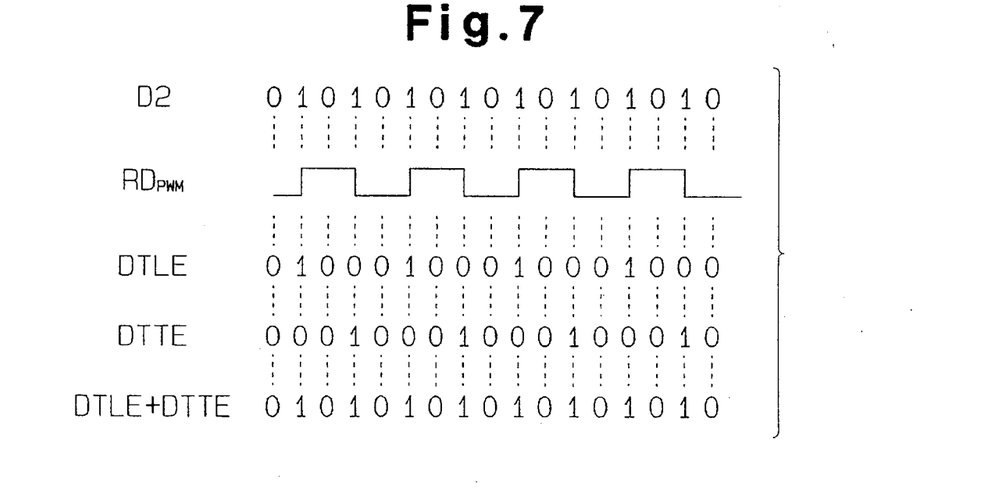
FIG. 7 is a diagram showing the relationship between a data waveform and output data.

Referring to FIG. 7, data DTLE and DTTE of the two signal processors 81 and 82 will be described.

When data D2 in a lockup pattern section of a sector is:

"0, 1, 0, 1, 0, 1, 0, 1, 0, 1, 0, 1, . . . ", the first signal processor 81 outputs data DTLE as follows:

"0, 1, 0, 0, 0, 1, 0, 0, 0, 1, 0, 0, . . . ", and the second signal processor 82 outputs data DTTE as follows:

"0, 0, 0, 1, 0, 0, 0, 1, 0, 0, 0, 1, . . . ".

The data DTLE and DTTE are supplied to a disk controller 85, which acquires their logical sum in order to yield the data D2 in the lockup pattern section.

In order to combine the two data DTLE and DTTE of the two signal processors 81 and 82 to produce the data D2 in a lockup pattern section, however, the output timings for the data DTLE and DTTE should be synchronized with each other.

For example, there may be a case where the data DTTE from the second signal processor 82 is output faster by one bit data than the data DTLE, such that the data DTTE is as follows:

"0, 0, 1, 0, 0, 0, 1, 0, 0, 0, 1, 0, . . . ".

In this case, the execution of a logical sum between DTTE and DTLE in the controller 85 yields:

"0, 1, 1, 0, 0, 1, 1, 0, 0, 1, 1, 0, . . . ", which is not the original data D2 in the lockup pattern section. As a result, the data D2 in the lockup pattern section cannot be read correctly. Failing to read the data D2 correctly causes a failure to read the subsequent sync pattern data, user data in user data sections, etc.

In order to prevent the failure of data reading, the controller 85 synchronizes the data DTLE and DTTE from the two signal processors 81 and 82. In general, a lockup pattern section follows a sector mark section in a sector, so that it is possible to determine whether what is currently read is the data D2 in the lockup pattern section. Data of a sector mark recorded in a sector mark section is Burst Data, and, unlike the arrangement of other data recording areas, is characterized by a bit data arrangement under which "0" data groups and "1" data groups are alternately arranged as follows:

"0, 0, 0, 0, 1, 1, 1, 0, 0, 0, 1, 1, 1, . . . ".

Therefore, even when the signal processors 81 and 82 are asynchronous, the controller 85 can still determine whether data in the sector mark section is being read out. Thus, the controller 85 can easily determine that the data to be read subsequently is the data D2 in the lockup pattern section.

When it is determined that the data obtained by synthesis of DTLE and DTTE is not the original data D2 in the lockup pattern section, the controller 85 determines which of the outputs from the two signal processors 81 and 82 is shifted and by how much it is shifted. More specifically, the controller 85 operates to shift the timing (synchronization) of data output from one of the signal processors such that a logical sum of DTLE and DTTE matches with the original data D2 in the lockup pattern section. When the logical sum becomes the original data D2 in the lockup pattern section, the controller 85 makes the determination that the data DTLE and DTTE output from the signal processors 81 and 82 is synchronized. Then, the controller 85 sequentially combines the data DTLE and DTTE.

Therefore, the data DTLE and DTTE, output from the signal processors 81 and 82 based on the signal waveform $RD_{PWM}$ of the data D2, are synchronized by the controller 85. Consequently, erroneous reading of data, such as sync pattern data or user data, and the failure of data reading will be avoided.

Figure 8:
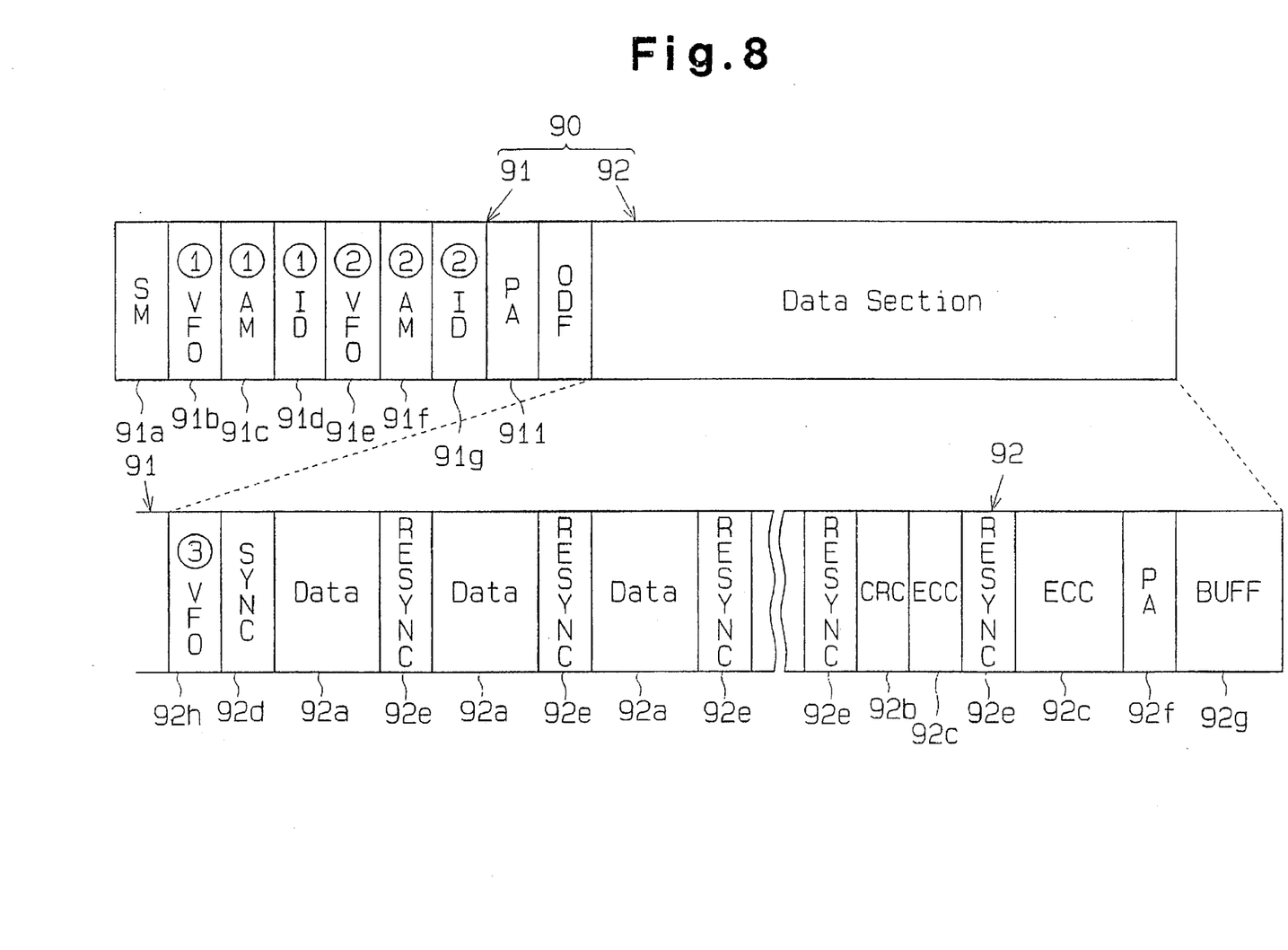
FIG. 8 is a diagram illustrating the format of a sector.

FIG. 8 schematically shows the recording format of each sector on an optical disk. Each sector 90 is generally separated into an ID section 91 and a data section 92. The ID section 91 includes a sector mark section (SM) 91a, a first lockup pattern section (first VFO) 91b, a first address mark section (first AM) 91c, a first physical address section (first ID) 91d, a second lockup pattern section (second VFO) 91e, a second address mark section (second AM) 91f, a second physical address section (second ID) 91g, and a postamble section (PA) 91h. The data section 92 includes a third lockup pattern section (third VFO) 92h, a plurality of user data sections 92a, an error check code section (CRC) 92b, an error correction code section (ECC) 92c, a sync pattern section (SYNC) 92d for synchronization, a plurality of resync pattern sections (RESYNC) 92e for resynchronization, a postamble section (PA) 92f and a buffer section (BUFF) 92g.

Data D2 in a lockup pattern section, which is used for synchronization, is found in each of the VFO sections. Even after synchronization is obtained at each VFO section, the timing of the data DTLE and DTTE output from the two signal processors 81 and 82 may be unbalanced. When this is the case, synchronization cannot be obtained until a subsequent VFO section is detected, thus resulting in the disabling of data reading until synchronization can be obtained.

SUMMARY OF THE INVENTION

Broadly speaking, the present invention relates to an apparatus and method for correctly reading data previously recorded to a recording medium according to a PWM system without being affected by unintentional shifting of leading and trailing edges in a signal waveform.

An apparatus according to an embodiment of the present invention is provided for detecting and reading a pattern for synchronization in two data signals produced from data recorded on a recording medium by a pulse width modulation (PWM) system. One of the two data signals is leading edge data based on leading edges of the signal waveform of the PWM data, while the other of the two data signals is trailing edge data based on trailing edges of signal waveform of the PWM data. The apparatus comprises: a first sync pattern detector for detecting a leading edge based sync pattern prepared with respect to a pattern for synchronization from the leading edge data; a second sync pattern detector for detecting a trailing edge based sync pattern prepared with respect to the pattern for synchronization from the trailing edge data; a first signal generator for outputting a signal to stop an operation of the first sync pattern detector when the first sync pattern detector detects the leading edge based sync pattern; a second signal generator for outputting a signal to stop an operation of the second sync pattern detector when the second sync pattern detector detects the trailing edge based sync pattern; a first time check circuit for restarting the interrupted operation of the first sync pattern detector when the leading edge based sync pattern is detected before the detection of the trailing edge based sync pattern and when the trailing edge based sync pattern is not detected within a predetermined period of time from the detection of the leading edge based sync pattern; and a second time check circuit for restarting the interrupted operation of the second sync pattern detector when the trailing edge based sync pattern is detected before the detection of the leading edge based sync pattern and when the leading edge based sync pattern is not detected within a predetermined period of time from the detection of the trailing edge based sync pattern.

A method of reading a sync pattern in PWM data recorded on a recording medium includes the steps of: producing, from the PWM data, leading edge data based on leading edges of signal waveforms of the PWM data; producing, from the PWM data, trailing edge data based on trailing edges of signal waveforms of the PWM data; preparing a leading edge based sync pattern from the leading edge data; preparing a trailing edge based sync pattern from the trailing edge data; detecting the leading edge based sync pattern and the trailing edge based sync pattern; stopping a detection of the leading edge based sync pattern when the leading edge based sync pattern is detected before the detection of the trailing edge based sync pattern, followed by resuming a detection of the leading edge based sync pattern when the trailing edge based sync pattern is not detected within a predetermined period of time from the detection of the leading edge based sync pattern; and stopping a detection of the trailing edge based sync pattern when the trailing edge based sync pattern is detected before the detection of the leading edge based sync pattern, followed by resuming a detection of the trailing edge based sync pattern when the leading edge based sync pattern is not detected within a predetermined period of time from the detection of the trailing edge based sync pattern.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention, together with the objects and the advantages thereof, may best be understood by reference to the following description of the presently preferred embodiments together with the accompanying drawings in which.

DETAILED DESCRIPTION OF THE PREFERRED EMBODIMENTS

Figure 9:
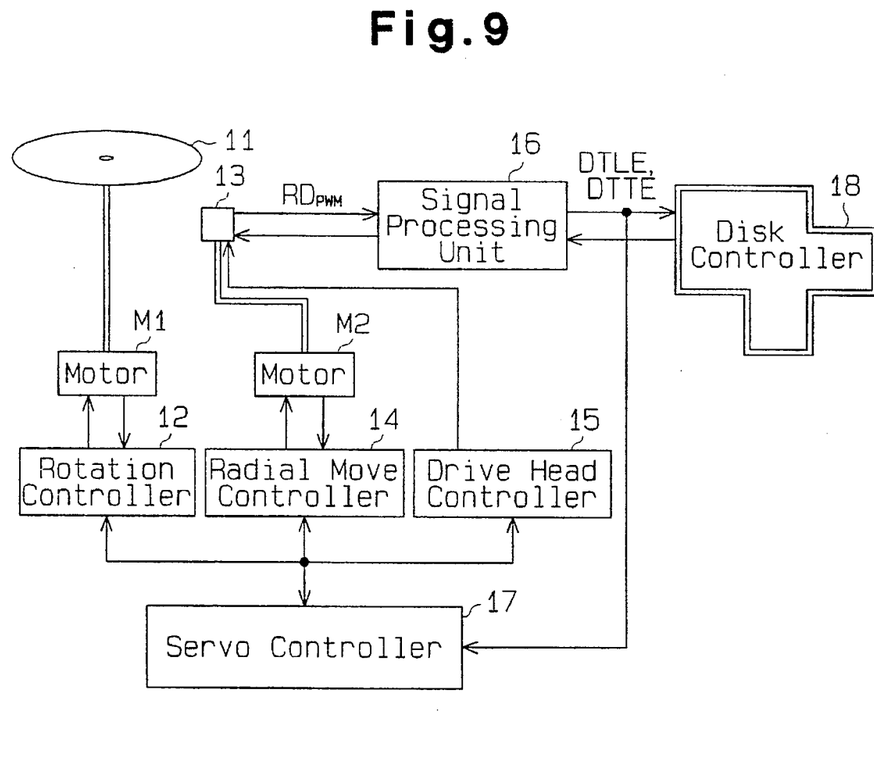
FIG. 9 is a block circuit diagram showing a general structure of an optical disk driving apparatus according to an embodiment of the present invention.

An optical disk apparatus according to an embodiment of the present invention will now be described with reference to FIGS. 9 through 14. FIG. 9 is a general circuit diagram showing an optical disk apparatus which reads data from and writes data to an optical disk as a recording medium. An optical disk 11, handled by the optical disk apparatus, has data recorded in accordance with a pulse width modulation (PWM) system. The format of each sector in the disk 11 is essentially the same as the format as shown in FIG. 8 which was previously discussed.

The optical disk 11 is rotated by a motor M1, which is controlled by a rotation control circuit 12. A drive head 13 is driven by a motor M2 to move in the radial direction of the optical disk 11. The motor M2 is controlled by a radial movement control circuit 14. The drive head 13 is formed by an optical pickup device for reading record data from the optical disk and for writing data on the optical disk 11. A drive head control circuit 15 controls a drive head 13 for data recording and data reproduction with respect to the optical disk 11. A signal waveform output from the drive head 13 is supplied as read data $RD_{PWM}$ to a signal processing unit 16.

Figure 10:
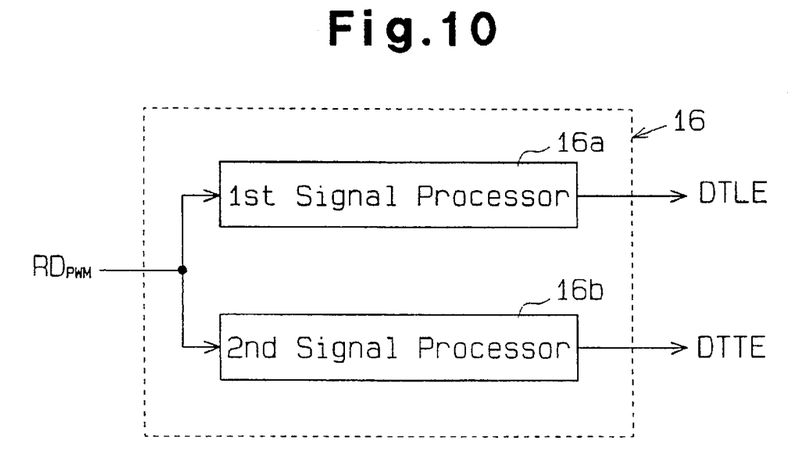
FIG. 10 is a block circuit diagram showing a signal processing unit of the optical disk driving apparatus.

The signal processing unit 16 is substantially the same as the signal processing circuit 80 shown in FIG. 6. FIG. 10 shows the circuit configuration of the signal processing unit 16. The signal processing unit 16 includes a first signal processor 16a and a second signal processor 16b. The first signal processor 16a, which is substantially the same as the first signal processor 81 shown in FIG. 6, outputs data DTLE based on the detection of leading edges of the signal waveform $RD_{PWM}$. The second signal processor 16b, which is substantially the same as the second signal processor 82 shown in FIG. 6, outputs data DTTE based on the detection of trailing edges of the signal waveform $RD_{PWM}$.

A disk controller 18 shown in FIG. 9 receives the data DTLE and DTTE from the signal processing unit 16, and combines the two data DTLE and DTTE to produce read data RD, from which a variety of information may be obtained. The disk controller 18 outputs write data WD, which is to be recorded in one of the sectors 90, to the signal processing unit 16. A servo controller 17 outputs various drive control signals to the control circuits 12, 14 and 15, in order to seek the drive head 13 to a track position belonging to a target sector 90 for data reading and writing and to set the rotational speed of the optical disk 11 to a desired speed.

Figure 11:
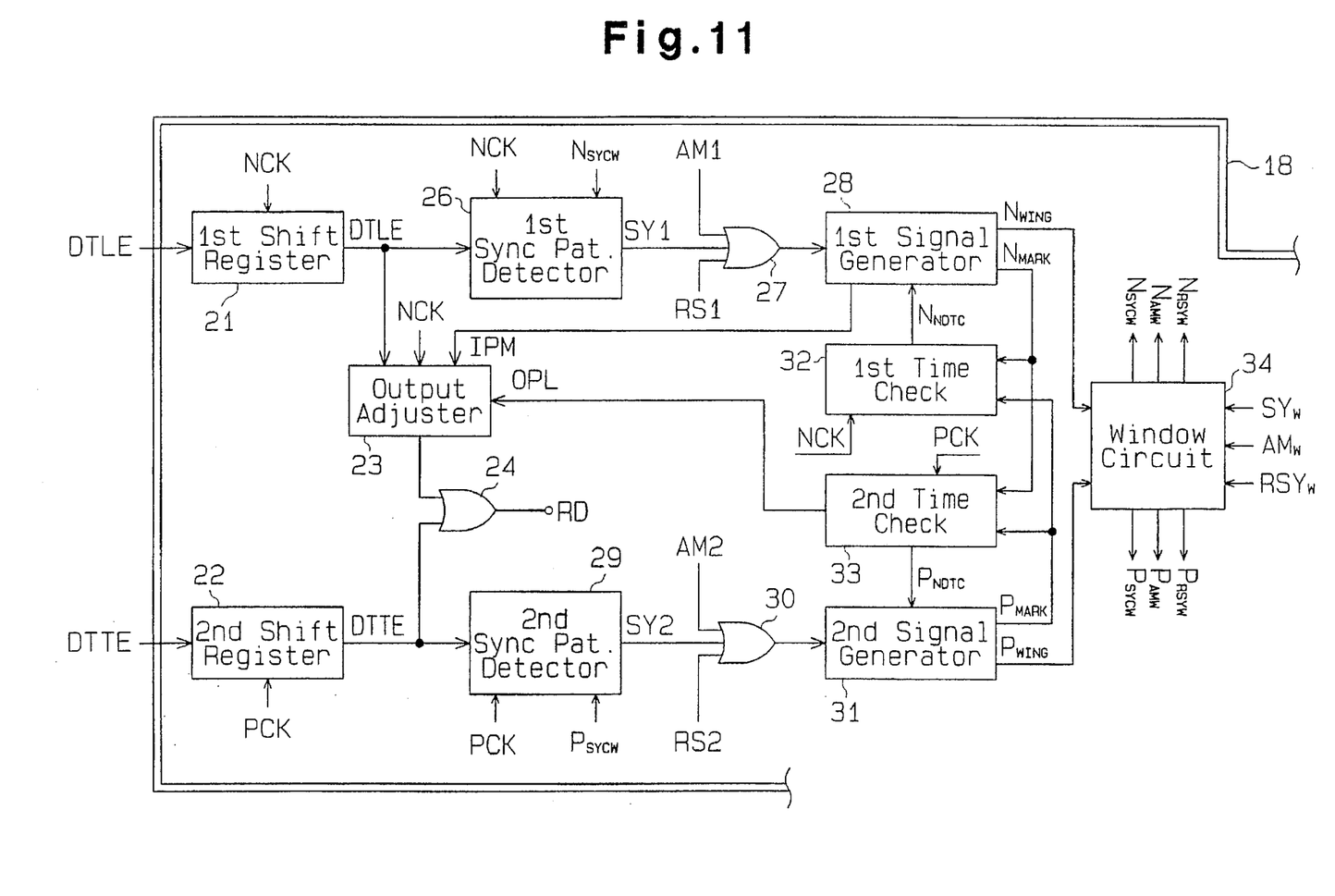
FIG. 11 is a block circuit diagram showing a sync pattern detector incorporated into a disk controller of the optical disk driving apparatus.

FIG. 11 shows a sync pattern detector incorporated in the disk controller 18. A first shift register 21 is a 57-bit shift register which sequentially receives, bit by bit, data DTLE output from the first signal processor 16a. The data DTLE output is synchronized with a clock NCK. The first shift register 21 sequentially outputs the earliest input bit of the data DTLE, synchronized with the clock NCK.

A second shift register 22 is a 57-bit shift register which sequentially receives, bit by bit, data DTTE output from the second signal processor 16b. The data DTTE is synchronized with a clock PCK. The second shift register 22 sequentially outputs the earliest input bit of the data DTTE, synchronized with the clock PCK. The clock PCK has the same period as that of the clock NCK.

A data output adjusting circuit 23 includes a plurality of FIRST IN FIRST OUT (FIFO) registers (not shown) and a save register (not shown). The adjusting circuit 23 receives bit data of the data DTLE from the first shift register 21, synchronized with the clock NCK, shifts the early-input bit data and outputs the earliest input bit data. The adjusting circuit 23 receives a one-shot control signal IPM from a first signal generator 28 and a one-shot control signal OPL from a second time check circuit 33.

In response to the control signal IPM, the adjusting circuit 23 writes the current value of an input pointer to its save register. If the control signal IPM is the first input after resetting, the input pointer then starts. The input pointer is synchronized with the clock NCK, until it is reset.

Thereafter, in response to a control signal OPL, the initial value of an output pointer is read from the save register, and the data DTLE is output starting from the point equivalent to the pointer value. Also, the output pointer starts, and is synchronized with the clock PCK. This operation allows the synchronization of the data DTLE with the clock NCK to be changed to the synchronization with the clock PCK.

Accordingly, the output of the data DTLE is delayed by the time difference between the control signal IPM and the control signal OPL. The time difference is predetermined to be an allowance for the shift of the data DTLE and DTTE.

With the predetermined time difference set to four clocks (4CLK), if the data DTTE lags by three clocks (3CLK) from the data DTLE, the control signal OPL is input with a delay of 3CLK as compared with the case where there is no data shift. The time difference between the control signal IPM and the control signal OPL becomes 7CLK, so that the data DTLE is output with a delay of 3CLK as compared with the case where there is no data shift.

When the control signal IPM is input but the signal OPL is not input, the output pointer does not function. By not functioning, the output pointer is not affected by the data DTLE.

In this embodiment, it is assumed that the allowance for the shift of data DTLE and DTTE is 4CLK.

An OR gate 24 receives the data DTLE output from the data output adjusting circuit 23 and the data DTTE output from the second shift register 22. The OR gate 24 combines data bits of the data DTLE with data bits of the data DTTE and outputs therefrom the combined bit data as read data RD.

It should be noted that the data DTTE input to the OR gate 24 should be more delayed, as for example by the allowance (i.e., 4CLK in this embodiment) previously determined by the data output adjusting circuit 23, than the data DTLE input to the data output adjusting circuit 23.

A first sync pattern detecting circuit 26 includes a 57-bit shift register (not shown) and a comparator (not shown). The first sync pattern detecting circuit 26 sequentially receives data bits of the data DTLE output from the first shift register 21, synchronized with the clock NCK, and shifts earlier input data bits to erase the earliest input data bit. The comparator of the first sync pattern detecting circuit 26 compares the 57 bits of data DTLE with a previously prepared leading edge sync pattern (herein referred to as "first sync pattern") upon each shift. The period of the detecting operation of the first sync pattern detecting circuit 26 is controlled by an operation control signal $N_{SYCW}$ from a window circuit 34. The first sync pattern detecting circuit 26 determines whether the data DTLE is the first sync pattern, within the limited period. When the data DTLE coincides with the first sync pattern, the first sync pattern detecting circuit 26 outputs a first sync pattern detection signal SY1.

The first sync pattern for leading edge is prepared based on a sync pattern for synchronization (herein referred to as "reference sync pattern"). The reference sync pattern consists of 57 bits, and is recorded in the SYNC 92d in each sector 90. The steps involved with preparing the first sync pattern for leading edges from the reference sync pattern will be described below. When the reference sync pattern in accordance with the PWM system is read by the drive head 13, data DTLE, which the first signal processor 16a produces based on a signal waveform $RD_{PWM}$ of the reference sync pattern from the drive head 13, is regarded as the first sync pattern for leading edges. Every time data DTLE is input from the first shift register 21, the first sync pattern detecting circuit 26 compares each data DTLE input from the first shift register 21 with the first sync pattern for leading edges, and outputs its comparison result.

The first sync pattern detection signal SY1 is output from the first sync pattern detecting circuit 26 to a first signal generator 28 via an OR gate 27. Based on the first sync pattern detection signal SY1, the first signal generator 28 generates a first pattern detection signal $N_{MARK}$ on the leading edge, a first window control signal $N_{WING}$ and the control signal IPM.

A second sync pattern detecting circuit 29 contains a 57-bit type of shift register (not shown) and a comparator (not shown). The second sync pattern detecting circuit 29 sequentially receives data bits of the data DTTE output from the second shift register 22, synchronized with the clock PCK, and shifts earlier input data bits to erase the earliest input data bit. As each bit is shifted, the comparator of the second sync pattern detecting circuit 29 compares 57 bits of data DTTE with a previously prepared trailing edge sync pattern (herein referred to as "second sync pattern"). The period of the detecting operation of the second sync pattern detecting circuit 29 is controlled by an operation control signal $P_{SYCW}$ from the window circuit 34. The second sync pattern detecting circuit 29 determines whether data DTTE is the second sync pattern within the limited period. When the data DTTE coincides with the second sync pattern for trailing edges, the second sync pattern detecting circuit 29 outputs a second sync pattern detection signal SY2. The second sync pattern for trailing edges is prepared based on the aforementioned reference sync pattern. The preparation of the second sync pattern will be described below. When the reference sync pattern in accordance with the PWM system is read by the drive head 13, data DTTE, which the second signal processor 16b produces based on the signal waveform $RD_{PWM}$ for the reference sync pattern from the drive head 13, is regarded as the second sync pattern. Every time data DTTE is input from the second shift register 22, the second sync pattern detecting circuit 29 compares the data DTTE input from the second shift register 22 with the second sync pattern.

A second sync pattern detection signal SY2 is output from the second sync pattern detecting circuit 29 to a second signal generator 31 via an OR gate 30. Based on the second sync pattern detection signal SY2, the second signal generator 31 outputs a second pattern detection signal $P_{MARK}$ on the trailing edge and a second window control signal $P_{WING}$.

The first time check circuit 32 receives the clock NCK, the first pattern detection signal $N_{MARK}$, and the second pattern detection signal $P_{MARK}$. The first time check circuit 32 includes a Johnson counter (not shown). The Johnson counter is initialized in response to the first pattern detection signal $N_{MARK}$ and counts the number of pulses of the clock NCK. If the second pattern detection signal $P_{MARK}$ is not input until the Johnson counter counts the number of clock pulses to four, the first time check circuit 32 outputs a control signal $N_{NDTC}$ to the first signal generator 28. In response to the control Signal $N_{NDTC}$, the first signal generator 28 clears the first pattern detection signal $N_{MARK}$ and first window control signal $N_{WING}$, which have been output so far.

A second time check circuit 33 receives the clock PCK, second pattern detection signal $P_{MARK}$ and first pattern detection signal $N_{MARK}$. The second time check circuit 33 includes a Johnson counter (not shown). The Johnson counter is initialized in response to the second pattern detection signal $P_{MARK}$ and counts the number of pulses of the clock PCK. If the first pattern detection signal $N_{MARK}$ is not input until the Johnson counter counts four clocks, the second time check circuit 33 outputs a control signal $P_{NDTC}$ to the second signal generator 31. In response to the control signal $P_{NDTC}$, the second signal generator 31 clears the second pattern detection signal $P_{MARK}$ and the second window control signal $P_{WING}$, which have been output so far. If the first pattern detection signal $N_{MARK}$ is input before the Johnson counter counts four clocks, the second time check circuit 33 outputs the control signal OPL after the Johnson counter finishes counting four clocks.

The window circuit 34 receives the first and second window control signals $N_{WING}$ and $P_{WING}$. The window circuit 34 also receives from a format counter (FMC) 41 (FIG. 12) a window signal $SY_W$ which is used to detect sync patterns. While the window signal $SY_W$ is being supplied, the window circuit 34 outputs the operation control signal $N_{SYCW}$ to the first sync pattern detecting circuit 26 and outputs the operation control signal $P_{SYCW}$ to the second sync pattern detecting circuit 29. The duration of the operation control signal $N_{SYCW}$ is the period during which the first sync pattern detecting circuit 26 operates to detect the first sync pattern. Likewise, the duration of the operation control signal $P_{SYCW}$ is the period during which the second sync pattern detecting circuit 29 operates to detect the second sync pattern.

With the operation control signals $N_{SYCW}$ and $P_{SYCW}$ being output, when receiving the first window control signal $N_{WING}$, the window circuit 34 stops outputting the operation control signal $N_{SYCW}$ for the first sync pattern detecting circuit 26. Only after clearing the first window control signal $N_{WING}$, does the window circuit 34 outputs an operation control signal $N_{SYCW}$ again.

Similarly, with the operation control signals $N_{SYCW}$ and $P_{SYCW}$ being output, when receiving the second window control signal $P_{WING}$, the window circuit 34 stops outputting the operation control signal $P_{SYCW}$ for the second sync pattern detecting circuit 29. Only after clearing the second window control signal $P_{WING}$, does the window circuit 34 output the operation control signal $P_{SYCW}$ again.

Figure 12:
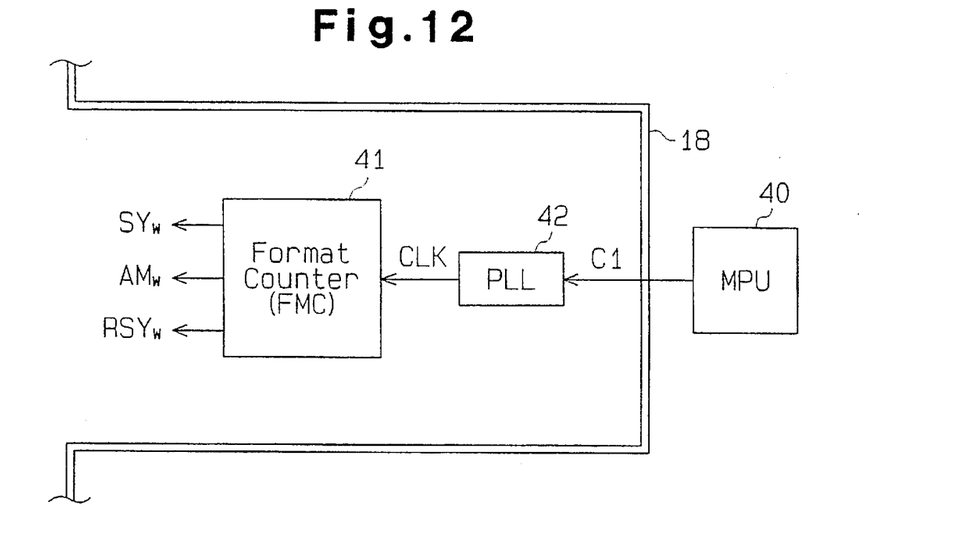
FIG. 12 is a block circuit diagram showing a format counter incorporated into a disk controller of the optical disk driving apparatus.

FIG. 12 shows a circuit provided in the disk controller 18 for outputting a window signal $SY_W$ to the window circuit 34. A microprocessing unit (MPU) 40, which controls the entire optical disk apparatus, is shared by the control circuits 12, 14 and 15, the servo controller 17 and the disk controller 18, as shown in FIG. 9. The format counter (FMC) 41 counts the number of pulses of a reference clock CLK from a PLL synthesizer 42. The PLL synthesizer 42 receives a control signal C1 from the MPU 40 and outputs the reference clock CLK at a frequency that corresponds to the control signal C1. The count value of the FMC 41 is correlated with individual bits of data in one sector 90 which is read by the drive head 13. When the count value of the FMC 41 coincides with the total number of data bits in one sector, the FMC 41 initializes the count value and counts from the beginning. The FMC 41 outputs the window signal $SY_W$ used for the detection of sync patterns, a window signal $AM_W$ used for the detection of an address mark and a window signal $RSY_W$ used for the detection of a resync pattern, in accordance with the count value.

The output timing for the window signal $SY_W$ corresponds to the position of the SYNC 92d in one sector 90. The output timing for the window signal $AM_W$ corresponds to the positions of the first AM 91c and the second AM 91f in one sector 90. The output timing for the window signal $RSY_W$ corresponds to the position of the RESYNC 92e in one sector 90. As long as the count values of the FMC 11 are synchronous with positions of the drive head 13, the output of individual data of the SYNC 92d, the first AM 91c and the second AM 91f and the RESYNC 92e from the drive head 13 is therefore synchronous with the output of individual window signals $SY_W$, $AM_W$ and $RSY_W$ from the FMC 41.

Figure 13:
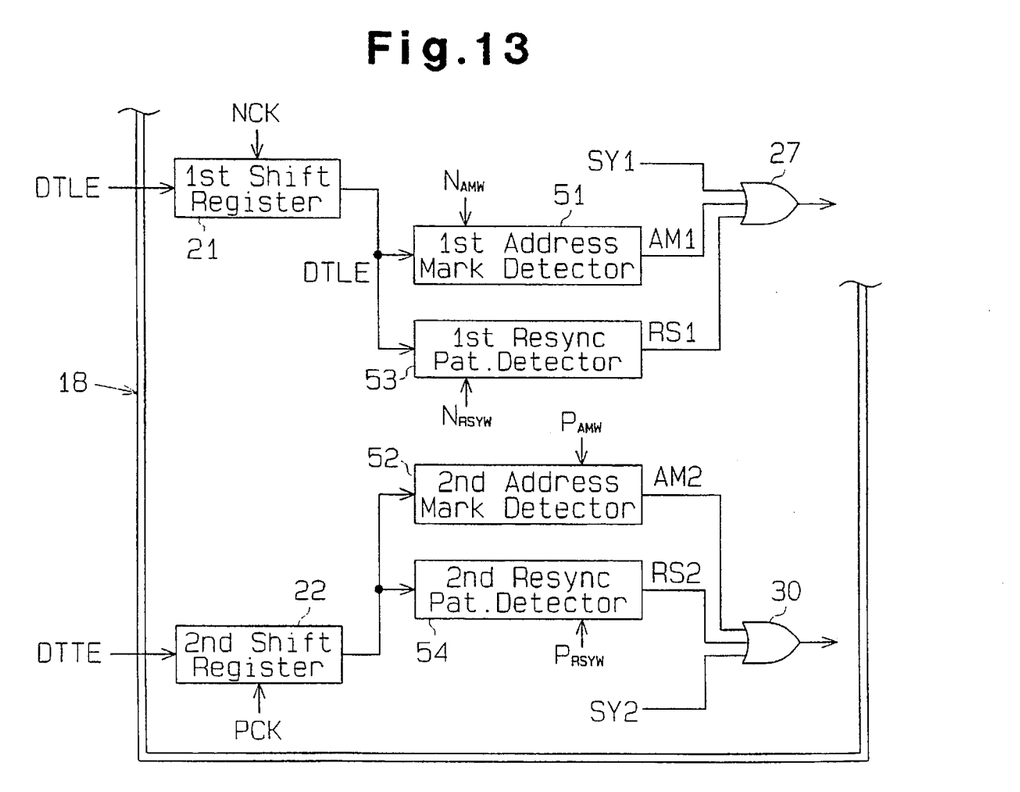
FIG. 13 is a block circuit diagram showing address mark and resync pattern detectors incorporated into a disk controller of the optical disk driving apparatus.

FIG. 13 shows address mark detecting circuits and resync pattern detecting circuits provided in the disk controller 18. A first address mark detecting circuit 51 includes a 19-bit type shift register (not shown) and a comparator (not shown). The first address mark detecting circuit 51 sequentially receives data bits of the data DTLE output from the first shift register 21, and shifts earlier input data bits to erase the earliest input data bit. As the bits are shifted, the comparator of the first address mark detecting circuit 51 compares 19 bits of data DTLE with a previously prepared pattern of an address mark for leading edges (herein referred to as "first address pattern"). The period of the detecting operation of the first address mark detecting circuit 51 is controlled by an operation control signal $N_{AMW}$ from the window circuit 34. The first address mark detecting circuit 51 determines whether data DTLE is the first address pattern within the limited period. When the data DTLE coincides with the first address pattern for leading edges, the first address mark detecting circuit 51 outputs a first address pattern detection signal AM1.

The first address pattern is prepared based on an address mark pattern (herein referred to as "reference address pattern"). The reference address pattern consists of 12 bits, and is recorded in the first AM 91c and the second AM 91f of each sector 90.

The preparation of the first address pattern will be described below. When the reference address pattern in accordance with the PWM system is read by the drive head 13, data DTLE, which the first signal processor 16a produces based on the signal waveform $RD_{PWM}$ for that reference address pattern from the drive head 13, is regarded as the first address pattern. The first address mark detecting circuit 51 compares each data DTLE from the first shift register 21 with the first address pattern, and outputs its comparison results.

The first address pattern detection signal AM1 is output from the first address mark detecting circuit 51 to the first signal generator 28 via the OR gate 27. Accordingly, the first signal generator 28 outputs the first pattern detection signal $N_{MARK}$ on the leading edge, the first window control signal $N_{WING}$ and the control signal IPM, based on the first address pattern detection signal AM1.

A second address mark detecting circuit 52 includes a 19-bit type shift register (not shown) and a comparator (not shown). The second address mark detecting circuit 52 sequentially receives data bits of the data DTTE output from the second shift register 22, and shifts earlier input data bits to erase the earliest input data bit. As each bit is shifted, the comparator of the second address mark detecting circuit 52 compares 19 bits of data DTTE with a previously prepared pattern of an address mark for trailing edges (herein referred to as "second address pattern"). The period of the detecting operation of the second address mark detecting circuit 52 is controlled by an operation control signal $P_{AMW}$ from the window circuit 34. The second address mark detecting circuit 52 determines whether the data DTTE is the second address pattern within the limited period. When the data DTTE coincides with the second address pattern, the second address mark detecting circuit 52 outputs a second address pattern detection signal AM2.

The second address pattern is prepared based on the reference address pattern. When the reference sync pattern in accordance with the PWM system is read by the drive head 13, data DTTE, which the second signal processor 16b produces based on the signal waveform $RD_{PWM}$ for that reference address pattern from the drive head 13, is regarded as the second address pattern. Accordingly, the second address mark detecting circuit 52 compares the data DTTE from the second shift register 22 with the second address pattern.

The second address pattern detection signal AM2 is output from the second address mark detecting circuit 52 to the second signal generator 31 via the OR gate 30. Based on the second address pattern detection signal AM2, the second signal generator 31 generates a second pattern detection signal $P_{MARK}$ on the trailing edge and the second window control signal $P_{WING}$.

A first resync pattern detecting circuit 53 includes a 23-bit type shift register (not shown) and a comparator (not shown). The first resync pattern detecting circuit 53 sequentially receives data bits of the data DTLE output from the first shift register 21, and shifts earlier input data bits to erase the earliest input data bit. As each bit is shifted, the comparator of the first resync pattern detecting circuit 53 compares 23 bits of data DTLE with a previously prepared leading edge resync pattern (herein referred to as "first resync pattern"). The period of the detecting operation of the first resync pattern detecting circuit 53 is controlled by an operation control signal $N_{RSYW}$ from the window circuit 34. The first resync pattern detecting circuit 53 determines whether the data DTLE is the first resync pattern within the limited period. When the data DTLE coincides with the first resync pattern, the first resync pattern detecting circuit 53 outputs a first resync pattern detection signal RS1.

The first resync pattern is prepared based on a resync pattern for synchronization (herein referred to as "reference resync pattern"). The reference resync pattern consists of 24 bits, and is recorded in the RESYNC 92e of each sector 90. Describing the preparation of the first resync pattern based on the reference resync pattern, when the reference resync pattern in accordance with the PWM system is read by the drive head 13, data DTLE, which the first signal processor 16a produces based on the signal waveform $RD_{PWM}$ for that reference resync pattern from the drive head 13, is regarded as the first resync pattern. The first resync pattern detecting circuit 53 compares each data DTLE from the first shift register 21 with the first resync pattern, and outputs its comparison result.

The first resync pattern detection signal RS1 is output from the first resync pattern detecting circuit 53 to the first signal generator 28 via the OR gate 27. Based on the first resync pattern detection signal RS1, the first signal generator 28 generates the first pattern detection signal $N_{MARK}$ on the leading edge, the first window control signal $N_{WING}$ and the control signal IPM.

A second resync pattern detecting circuit 54 includes a 23-bit type shift register (not shown) and a comparator (not shown). The second resync pattern detecting circuit 54 sequentially receives data bits of the data DTTE output from the second shift register 22, and shifts earlier input data bits to erase the earliest input data bit. As each bit is shifted, the comparator of the second resync pattern detecting circuit 54 compares 23 bits of the data DTTE with a previously prepared trailing edge second resync pattern. The period of the detecting operation of the second resync pattern detecting circuit 53 is controlled by an operation control signal $P_{RSYW}$ from the window circuit 34. The second resync pattern detecting circuit 54 determines whether the data DTTE is the second resync pattern within the limited period. When the data DTTE coincides with the second resync pattern, the second resync pattern detecting circuit 54 outputs a second resync pattern detection signal RS2.

The second resync pattern is prepared based upon the reference resync pattern. When the reference resync pattern in accordance with the PWM system is read by the drive head 13, data DTTE, which the second signal processor 16b produces based on the signal waveform $RD_{PWM}$ for that reference resync pattern from the drive head 13, is regarded as the second resync pattern. The second resync pattern detecting circuit 54 compares the data DTTE from the second shift register 22 with the second resync pattern.

The second resync pattern detection signal RS2 is output from the second resync pattern detecting circuit 54 to the second signal generator 31 via the OR gate 30. Based on the second resync pattern detection signal RS2, the second signal generator 31 generates the second pattern detection signal $P_{MARK}$ on the trailing edge and the second window control signal $P_{WING}$.

In response to the window signal $AM_W$ from the FMC 41, the window circuit 34 shown in FIG. 11 outputs an operation control signal $N_{AMW}$ to the first address mark detecting circuit 51 and an operation control signal $P_{AMW}$ to the second address mark detecting circuit 52. While the operation control signal $N_{AMW}$ is output, the first address mark detecting circuit 51 operates to detect the first address pattern. Likewise, while the operation control signal $P_{AMW}$ is output, the second address mark detecting circuit 52 operates to detect second the address pattern.

With the operation control signals $N_{AMW}$ and $P_{AMW}$ being output, when receiving the first window control signal $N_{WING}$ based on the first address pattern detection signal AM1, the window circuit 34 stops outputting the operation control signal $N_{AMW}$ for the first address mark detecting circuit 51. Only after clearing the first window control signal $N_{WING}$ does the window circuit 34 output an operation control signal $N_{AMW}$ again.

Similarly, with the operation control signals $N_{AMW}$ and $P_{AMW}$ being output, when receiving the second window control signal $P_{WING}$ based on the second address pattern detection signal AM2, the window circuit 34 stops outputting the operation control signal $P_{AMW}$ for the second address mark detecting circuit 52. Only after clearing the second window control signal $P_{WING}$ does the window circuit 34 output an operation control signal $P_{AMW}$ again.

Based on the window signal $RSY_W$ from the FMC 41, the window circuit 34 outputs an operation control signal $N_{RSYW}$ to the first resync pattern detecting circuit 53 and an operation control signal $P_{RSYW}$ to the second resync pattern detecting circuit 54. While the operation control signal $N_{RSYW}$ is output, the first resync pattern detecting circuit 53 operates to detect the first resync pattern. Likewise, while the operation control signal $P_{RSYW}$ is output, the second resync pattern detecting circuit 53 operates to detect the second resync pattern.

With the operation control signals $N_{RSYW}$ and $P_{RSYW}$ being output, when receiving the first window control signal $N_{WING}$ based on the first resync pattern detection signal RS1, the window circuit 34 stops outputting the operation control signal $N_{RSYW}$ for the first resync pattern detecting circuit 53. Once the first window control signal $N_{WING}$ is cleared, the window circuit 34 outputs an operation control signal $N_{RSYW}$ again.

Likewise, with the operation control signals $N_{RSYW}$ and $P_{RSYW}$ being output, when receiving the second window control signal $P_{WING}$ based on the second resync pattern detection signal RS2, the window circuit 34 stops outputting the operation control signal $P_{RSYW}$ for the second resync pattern detecting circuit 54. Once the second window control signal $P_{WING}$ is cleared, the window circuit 34 outputs the operation control signal $P_{RSYW}$ again.

Figure 14:
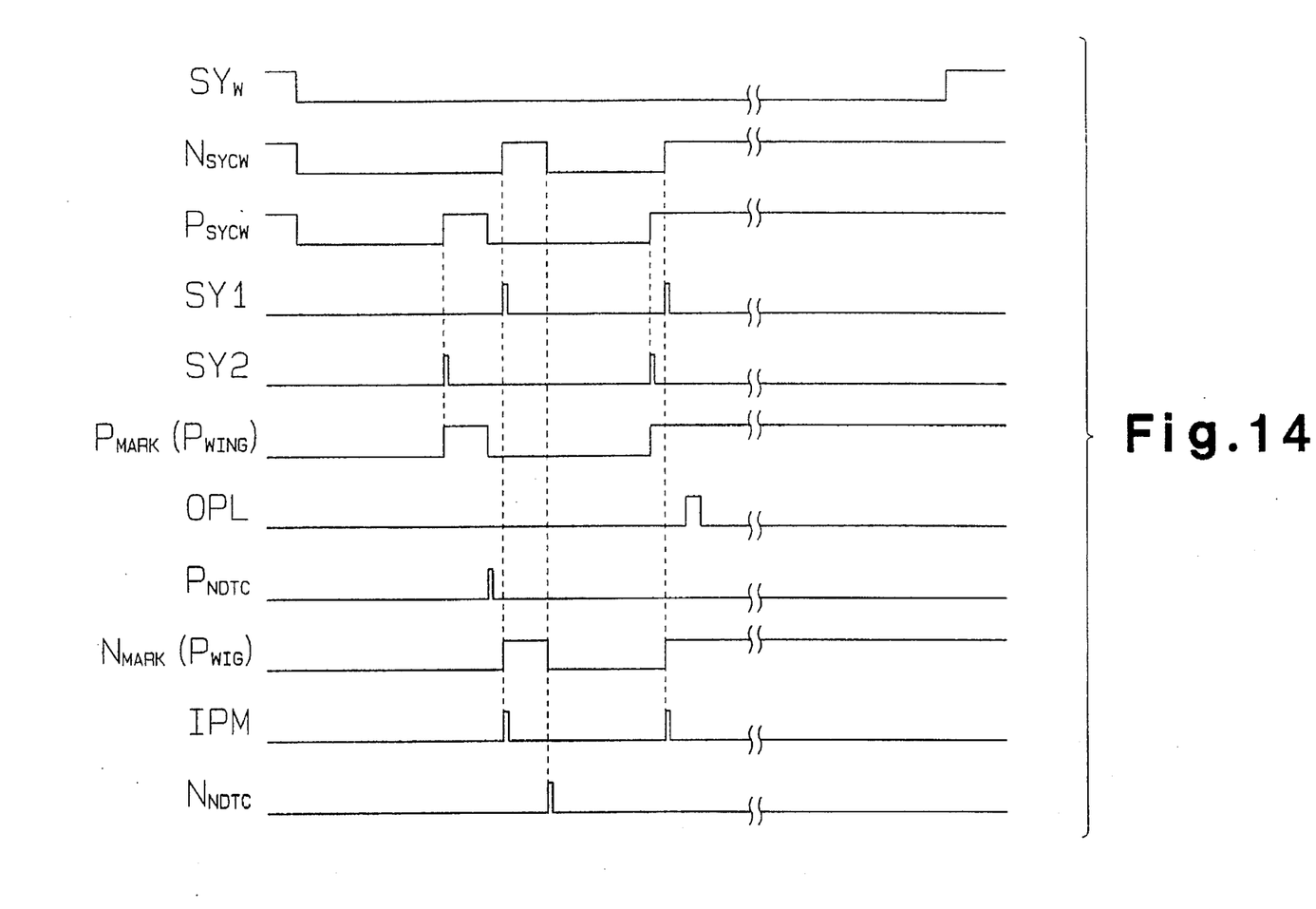
FIG. 14 is a time chart for explaining the operation of the sync pattern detector.

Operations of the above-described optical disk apparatus will now be described, referring to FIG. 14.

When the drive head 13 reads data recorded on the optical disk 11, signal waveform of the read data $RD_{PMW}$ is supplied to the signal processing unit 16. The first signal processor 16a of the signal processing unit 16 produces data DTLE based on the read data $RD_{PMW}$ with reference to leading edges of the signal waveform of $RD_{PMW}$. Data bits of the produced data DTLE are supplied to the first shift register 21. Likewise, the second signal processor 16b produces data DTTE based on the read data $RD_{PMW}$ with reference to trailing edges of the signal waveform of $RD_{PMW}$. Data bits of the produced data DTTE are supplied to the second shift register 22.

The first shift register 21 outputs the bit data DTLE to the OR gate 24 via the data output adjusting circuit 23. The second shift register 22 outputs the bit data DTTE to the OR gate 24. The OR gate 24 combines (performs the OR operation on) the bit data DTLE and the bit data DTTE, and outputs the result as read data RD. In other words, data in accordance with PWM system has been converted to the read data RD of the PPM data format by the OR gate 24. This data RD will be used or processed in the disk controller 18, as required.

When a window signal $SY_W$ is output to the window circuit 34 from the FMC 41, as shown in FIG. 12, the window circuit 34 outputs an operation control signal $N_{SYCW}$ to the first sync pattern detecting circuit 26 and an operation control signal $P_{SYCW}$ to the second sync pattern detecting circuit 29, in response to the window signal $SY_W$.

In response to the operation control signal $N_{SYCW}$, the first sync pattern detecting circuit 26 receives data bits of the data DTLE from the first shift register 21, and compares the input data DTLE with the first sync pattern previously prepared. In response to the operation control signal $P_{SYCW}$, the second sync pattern detecting circuit 29 receives data bits of the data DTTE from the second shift register 22, and compares the input data DTTE with the second sync pattern previously prepared. That is, the detection of the sync pattern recorded in the SYNC 92d in a sector 90 begins.

For example, if the second sync pattern detecting circuit 29 detects a second sync pattern before the first circuit 26 detects a first sync pattern, the second sync pattern detector 29 outputs a second sync pattern detection signal SY2. In response to the second sync pattern detection signal SY2 obtained via the OR gate 30 from the detector 29, the second signal generator 31 outputs a second pattern detection signal $P_{MARK}$ and a second window control signal $P_{WING}$. The window circuit 34 stops outputting the operation control signal $P_{SYCW}$ in response to the second window control signal $P_{WING}$. As soon as the operation control signal $P_{SYCW}$ disappears, the second sync pattern detecting circuit 29 stops its operation of comparison and detection.

In response to the second pattern detection signal $P_{MARK}$ from the second signal generator 31, the second time check circuit 33 operates the Johnson counter thereof. In the event that the first sync pattern detecting circuit 26 has detected a first sync pattern when the counter of the second time check circuit 33 has counted two pulses of clock PCK, a control signal IPM is input to the data output adjusting circuit 23. Then, the current input pointer is written in the save register, and the operation of the input pointer begins the storage of the data DTLE. When the counter of the second time check circuit 33 counts four pulses of clock PCK, a control signal OPL is output from the second time check circuit 33 to the data output adjusting circuit 23. Then, the value of the save register is provided to the output pointer, and the output pointer begins functioning to output the data DTLE. As a result, the data DTLE has been output earlier by two clock pulses over the control signal OPL.

As a result, the data bits of DTLE and the data bits of DTTE are synchronized. Once synchronized, the data DTLE and DTTE are subjected to an OR operation by the OR gate 24. The resultant data RD is used or processed as required, in the disk controller 18.

Because of the established synchronization, the first and second signal generators 28 and 31 continue the signal output until the window signal $SY_W$ disappears. Once synchronization is accomplished, therefore, the comparison and detection operations of the first and second sync pattern detecting circuits 26 and 29 are terminated until the next new window signal $SY_W$.

In the event that the first sync pattern detecting circuit 26 has not detected a first sync pattern while the counter of the second time check circuit 33 counts four pulses of clock PCK, the second time check circuit 33 outputs a control signal $P_{NDCT}$ to the second signal generator 31.

In this case, when no control signal OPL is received, the data output adjusting circuit 23 merely performs an operation to write the value of the input pointer to the save register in response to a control signal IPM. Consequently, the output of the data DTLE is not affected.

The second signal generator 31 clears the second pattern detection signal $P_{MARK}$ and the second window control signal $P_{WING}$ in response to the control signal $P_{NDCT}$. Accordingly, the window circuit 34 outputs an operation control signal $P_{SYCW}$ again. Then, the second sync pattern detecting circuit 29 receives the bit data DTTE from the second shift register 22 and starts the detection of the second sync pattern.

When the first sync pattern detecting circuit 26 detects a first sync pattern thereafter, the first sync pattern detecting circuit 26 outputs a first sync pattern detection signal SY1. In response to the first sync pattern detection signal SY1, the first signal generator 28 outputs a first pattern detection signal $N_{MARK}$, a first window control signal $N_{WING}$, and a control signal IPM. The window circuit 34 stops outputting the operation control signal $N_{SYCW}$ in response to the first window control signal $N_{WING}$. The first sync pattern detecting circuit 26 stops the comparison and detection operations when the operation control signal $N_{SYCW}$ disappears.

The first time check circuit 32 operates its Johnson counter in response to the first pattern detection signal $N_{MARK}$. When a second sync pattern has not been detected while the counter of the first time check circuit 32 counts four pulses of clock PCK, the first time check circuit 32 outputs a control signal $N_{NDCT}$ to the first signal generator 28.

In response to the control signal $N_{NDCT}$, the first signal generator 28 clears the first pattern detection signal $N_{MARK}$ and the first window control signal $M_{WING}$. Then, the window circuit 34 outputs an operation control signal $N_{SYCW}$ again. The first sync pattern detecting circuit 26 receives the bit data DTLE from the first shift register 21 again and starts the detection of the first sync pattern. At this time, due to the fact that the data output adjusting circuit 23 receives neither the control signal IPM nor the control signal OPL, the circuit 23 is not influenced by their signals.

When the second sync pattern detecting circuit 29 detects a second sync pattern and outputs a second sync pattern detection signal SY2 again, the second signal generator 31 outputs a second pattern detection signal $P_{MARK}$ and a second window control signal $P_{WING}$. The window circuit 34 stops outputting the operation control signal $P_{SYCW}$ in response to the second window control signal $P_{WING}$. The second sync pattern detecting circuit 29 stops the comparison and detection operations when the operation control signal $P_{SYCW}$ disappears.

The second time check circuit 33 operates its Johnson counter in response to the second pattern detection signal $P_{MARK}$. In the event that the first sync pattern detecting circuit 26 has detected a first sync pattern when the counter of the second time check circuit 33 has counted one pulse of clock PCK, control signal $P_{NDCT}$ is not output from the second time check circuit 33 to the second signal generator 31.

Approximately three clock pulses from an input of the control signal IPM to a subsequent input of the control signal OPL in the data output adjusting circuit 23. As a result, the data DTLE is output earlier by one pulse of clock PCK, thus canceling the deviation of the synchronization.

For example, when the first sync pattern detecting circuit 26 detects a first sync pattern before the second sync pattern detecting circuit 29 detects a second sync pattern, the first detecting circuit 26 outputs a first sync pattern detection signal SY1. In response to the first sync pattern detection signal SY1, the first signal generator 28 outputs the first pattern detection signal $N_{MARK}$, the first window control signal $N_{WING}$ and the control signal IPM. The window circuit 34 stops outputting the operation control signal $N_{SYCW}$ in response to the first window control signal $N_{WING}$. The first sync pattern detecting circuit 26 stops the comparison and detection operations when the operation control signal $N_{SYCW}$ disappears. The first time check circuit 32 operates its Johnson counter in response to the first pattern detection signal $N_{MARK}$. In response to the control signal IPM, the data output adjusting circuit 23 operates to write the value of the input pointer to the save register.

In this situation, suppose that the second sync pattern detecting circuit 29 has detected a second sync pattern when the counter of the first time check circuit 32 has counted two pulses of clock NCK, the second time check circuit 33 outputs a control signal OPL.

The second time check circuit 33 outputs the control signal OPL after counting four pulses of clock PCK. During that period, the data output adjusting circuit 23 accumulates data DTLE for six pulses of clock NCK, and then outputs the accumulated data DTLE. This means that the data DTLE is output with a delay of two clock pulses, thereby canceling the difference in the synchronization between the data DTLE and the data DTTE. As a result, the synchronized data DTLE and DTTE are combined (i.e., are subjected to an OR operation) by the OR gate 24. The resultant data RD is used or processed as required by the disk controller 18.

Because of the established synchronization, the first and second signal generators 28 and 31 continue outputting signals until the window signal $SY_W$ disappears. Once synchronization is achieved, therefore, the comparison and detection operations of the first and second sync pattern detecting circuits 26 and 29 are terminated until the next new window signal $SY_W$.

Upon the detection of an address mark, the first and second address mark detecting circuits 51 and 52 perform the comparison and detection of the associated first and second address patterns, in the same manner as described with respect to the detection of sync patterns. Based on the detection results, the first and second signal generators 28 and 31, and the first and second time check circuits 32 and 33 operate in similar ways to cancel the deviation in the synchronization between the data DTLE and the data DTTE.

Upon the detection of a resync pattern, the first and second resync pattern detecting circuits 53 and 54 perform the comparison and detection of the associated first and second resync patterns in the same manner as described with respect to the detection of sync pattern. Based on the detection results, the first and second signal generators 28 and 31, and the first and second time check circuits 32 and 33 operate in similar ways to cancel the deviation in the synchronization between the data DTLE and the data DTTE.

According to the present invention, even if the output timing for the leading-edge based data DTLE from the first signal processor 16a is shifted from the output timing for the trailing-edge based data DTTE from the second signal processor 16b, the output timing can be adjusted when a sync pattern is detected. When compared with the conventional art in which the output timing is adjusted based only on data in the lockup pattern section, it should be clear that data may be read more accurately with the techniques of the present invention.

Further, according to the present invention, even when the detection of either the first sync pattern or the second sync pattern has succeeded, with the detection of the other sync pattern failing for some reason, the detection of the first sync pattern and the second sync pattern may be executed again. The optical disk apparatus does not therefore immediately determine a system error in response to a single detection failure. This improves the reliability of the optical disk apparatus.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following forms.

The present invention may be adapted to an optical disk apparatus which detects at least one sync pattern, an address mark and a resync pattern.

Although the output timing for the leading-edge based data DTLE is adjusted by the data output adjusting circuit 23 in the above described embodiment, an additional data output adjusting circuit for the trailing-edge based data DTTE may be provided, so that the timing adjustment is carried out with the two adjusting circuits.

Although the above-described embodiment is adapted to an optical disk apparatus which uses the optical disk 11 as a recording medium, the present invention may be adapted to a disk apparatus which uses a magnetic disk as a recording medium.

Therefore, the present examples and embodiments are to be considered as illustrative and not restrictive and the invention is not to be limited to the details given herein, but may be modified within the scope of the appended claims.

What is claimed is:

1. An apparatus for detecting and reading a pattern for synchronization in two data signals produced from pulse width modulation (PWM) data recorded on a recording medium by a pulse width modulation system, one of said two data signals being leading edge data based on leading edges of signal waveform of the PWM data, the second of said two data signals being trailing edge data based on trailing edges of signal waveforms of the PWM data, said apparatus comprising:

a first sync pattern detector for detecting a leading edge based sync pattern prepared with respect to the pattern for synchronization from said leading edge data;

a second sync pattern detector for detecting a trailing edge based sync pattern prepared with respect to the pattern for synchronization from said trailing edge data;

a first signal generator for outputting a signal to stop an operation of said first sync pattern detector when said first sync pattern detector detects said leading edge based sync pattern;

a second signal generator for outputting a signal to stop an operation of said second sync pattern detector when said second sync pattern detector detects said trailing edge based sync pattern;

a first time check circuit for restarting the interrupted operation of said first sync pattern detector when said leading edge based sync pattern is detected before the detection of said trailing edge based sync pattern and when said trailing edge based sync pattern is not detected within a predetermined period of time from the detection of said leading edge based sync pattern; and a second time check circuit for restarting the interrupted operation of said second sync pattern detector when said trailing edge based sync pattern is detected before the detection of said leading edge based sync pattern and when said leading edge based sync pattern is not detected within a predetermined period of time from the detection of said trailing edge based sync pattern.

2. An apparatus for detecting and reading an address mark from two data signals produced from pulse width modulation (PWM) data recorded on a recording medium by a pulse width modulation system, one of said two data signals being leading edge data based on leading edges of signal waveforms of the PWM data, the second of said two data signals being trailing edge data based on trailing edges of signal waveform of the PWM data, said apparatus comprising:

a first address mark detector for detecting a leading edge based address pattern prepared with respect to the address mark from said leading edge data;

a second address mark detector for detecting a trailing edge based address pattern prepared with respect to the address mark from said trailing edge data;

a first signal generator for outputting a signal to stop an operation of said first address mark detector when said first address mark detector detects said leading edge based address pattern;

a second signal generator for outputting a signal to stop an operation of said second address mark detector when said second address mark detector detects said trailing edge based address pattern;

a first time check circuit for restarting the interrupted operation of said first address mark detector when said leading edge based address pattern is detected before the detection of said trailing edge based address pattern and when said trailing edge based address pattern is not detected within a predetermined period of time from the detection of said leading edge based address pattern; and a second time check circuit for restarting the interrupted operation of said second address mark detector when said trailing edge based address pattern is detected before the detection of said leading edge based address pattern and when said leading edge based address pattern is not detected within a predetermined period of time from the detection of said trailing edge based address pattern.

3. A data reading apparatus for reading pulse width modulation (PWM) data recorded on a recording medium by a pulse width modulation system, said PWM data being provided as two separate data signals, one of said two data signals being leading edge data based on leading edges of signal waveforms of the PWM data and the second of said two data signals being trailing edge data based on trailing edges of signal waveforms of the PWM data, said apparatus comprising:

a first address mark detector for detecting a leading edge based address pattern prepared with respect to an address mark from said leading edge data;

a second address mark detector for detecting a trailing edge based address pattern prepared with respect to an address mark from said trailing edge data;

a first signal generator for outputting a signal to stop an operation of said first address mark detector when said first address mark detector detects said leading edge based address pattern;

a second signal generator for outputting a signal to stop an operation of said second address mark detector when said second address mark detector detects said trailing edge based address pattern; and a data output adjusting circuit for adjusting the output timing of said leading edge data and said trailing edge data in order to cancel the deviation in the synchronization between said leading edge data and said trailing edge data, wherein when said leading edge based address pattern is detected before the detection of said trailing edge based address pattern and thereafter said trailing edge based address pattern is detected within a predetermined period of time from the detection of said leading edge based address pattern or when said trailing edge based address pattern is detected before the detection of said leading edge based address pattern and thereafter said leading edge based address pattern is detected within a predetermined period of time from the detection of said trailing edge based address pattern.

4. A disk apparatus equipped with the data reading apparatus as recited in claim 3.

* * * * *

UNITED STATES PATENT AND TRADEMARK OFFICE
CERTIFICATE OF CORRECTION

PATENT NO. : 5,661,708
DATED : August 26, 1997
INVENTOR(S) : Masashi Yamawaki

It is certified that error appears in the above-indentified patent and that said Letters Patent is hereby corrected as shown below:

Column 1, line 9, insert --,-- after "for".

Column 4, line 8, delete "$V_{ref.}$" and insert --$V_{refl.}$-- therefor.

Column 16, line 40, delete "$M_{WING}$" and insert --

$N_{WING}$-- therefor.

Signed and Sealed this

Twenty-fifth Day of August, 1998

Attest:

BRUCE LEHMAN

*Attesting Officer*     *Commissioner of Patents and Trademarks*